United States Patent
Personnet et al.

[11] Patent Number: 5,947,888
[45] Date of Patent: Sep. 7, 1999

[54] PROCESS FOR INSOLUBILIZING AND CONSOLIDATING SPENT LININGS FROM HALL-HEROULT ELECTROLYSIS CELLS

[75] Inventors: Pierre Personnet, Saint Jean de Maurienne; Gilbert Bouzat, Bollene, both of France

[73] Assignee: Aluminium Pechiney, Courbevoie, France

[21] Appl. No.: 08/977,537

[22] Filed: Nov. 25, 1997

[30] Foreign Application Priority Data

Nov. 26, 1996 [FR] France .................................. 96 14723

[51] Int. Cl.$^6$ ........................................ A62D 3/00
[52] U.S. Cl. .......................... 588/257; 264/117; 264/333; 501/155; 588/248; 588/256
[58] Field of Search .................... 588/248, 249, 588/252, 256, 257; 264/117, 319, 333; 405/128, 129; 501/155

[56] References Cited

U.S. PATENT DOCUMENTS

| | | | |
|---|---|---|---|
| 4,113,832 | 9/1978 | Bell et al. ................................ | 423/119 |
| 4,763,585 | 8/1988 | Rickman et al. . | |
| 5,037,286 | 8/1991 | Roberts ................................ | 264/117 X |
| 5,164,174 | 11/1992 | Banker et al. . | |
| 5,245,115 | 9/1993 | Barrillon et al. ........................ | 588/248 |
| 5,245,116 | 9/1993 | Bontron et al. .......................... | 588/248 |
| 5,365,012 | 11/1994 | Barrillon et al. ........................ | 588/248 |
| 5,446,407 | 8/1995 | Downs et al. ....................... | 588/256 X |
| 5,772,937 | 6/1998 | Cohen et al. ........................ | 588/256 X |

FOREIGN PATENT DOCUMENTS

| | | |
|---|---|---|
| 0 465 388 A1 | 1/1992 | European Pat. Off. . |
| 0 486 410 A1 | 5/1992 | European Pat. Off. . |
| 89/12498 | 12/1989 | WIPO . |
| 92/20469 | 11/1992 | WIPO . |

*Primary Examiner*—George Suchfield
*Attorney, Agent, or Firm*—Oblon, Spivak, McClelland, Maier & Neustadt, P.C.

[57] ABSTRACT

Process for insolubilizing and consolidating in pellet form the spent linings from electrolysis cells for the production of aluminium comprising grinding said spent linings and mixing them thoroughly with various pulverulent refractory additives before heating, characterized in that after the addition of:

a first additive intended to fix the alkali metals during firing, which is chosen from the group of aluminosilicates, and subsequently a second additive intended firstly to combine with the impregnating fluoride compounds during firing to form new stable, insoluble compounds, and secondly through its non-combined excess part to assure the consolidation of the mixture, and is chosen from the group of calcium oxides and salts, preferably limestone cements and mortars, the intimate mixture of ground, spent linings and said first and second pulverulent additives is agglomerated into pellet form before firing at a temperature in the range of from 700° C. to 950° C.

16 Claims, 1 Drawing Sheet

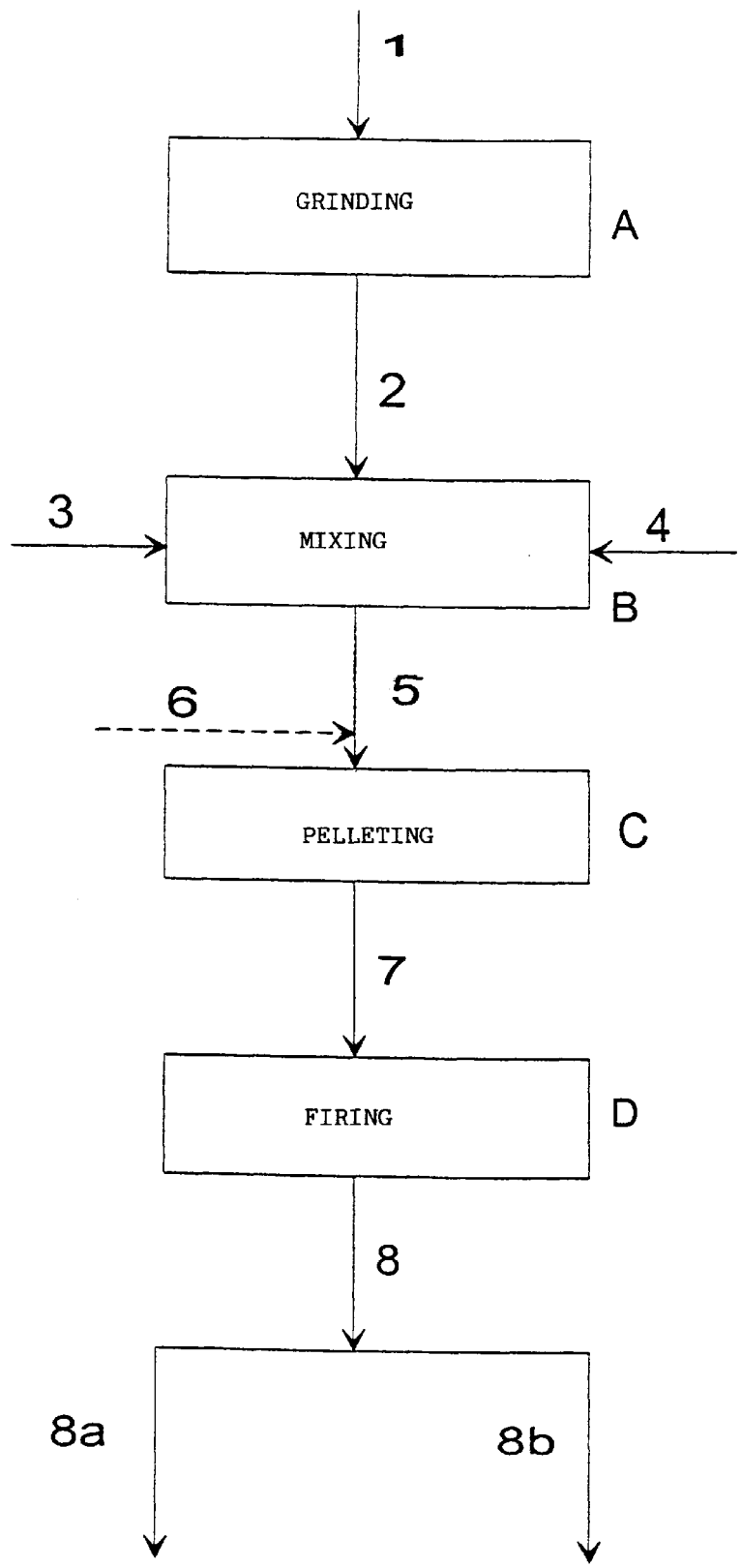
- Figure 1 -

PROCESS FOR INSOLUBILIZING AND CONSOLIDATING SPENT LININGS FROM HALL-HEROULT ELECTROLYSIS CELLS

TECHNICAL FIELD

This invention relates to a process for insolubilizing and consolidating in pellet form the spent linings from aluminium production furnaces which use the Hall-Heroult method of igneous electrolysis. These spent linings are made up of carbon cathode blocks, joints and sidewalls in carbon matter but also comprise all alumina or aluminosilicate refractories and insulation materials on the side walls and bottom of the metal pot shell which form the electrolysis cell. After use, these spent linings are highly impregnated with noxious products such as soluble sodium fluorides or sodium aluminium fluorides and cyanides which must be insolubilized or destroyed before discharge as waste or possible re-use.

STATE OF THE ART

Numerous publications have been made in this area. Methods have already been described for the wet processing of spent linings consisting of grinding followed by lixiviation with an alkaline liquid as for example in U.S. Pat. No. 4,052,288 (Aluminium Pechiney) and U.S. Pat. No. 4,113,831 (Kaiser). These methods are restricted to the sole processing of the carbon parts of the spent linings which need to be previously separated from the non-carbon parts formed by the refractory and insulation materials. They therefore give no solution to the problem of insolubilizing the non-carbon solid residues before storage or discharge as waste. While the wet process of U.S. Pat. No. 5,245,115 (EP0465388B) by Aluminium Pechiney can be used to treat these spent linings regardless of their composition, in particular of their silica and alumina content, like all wet processes it requires the set-up of very considerable means if a very advanced chemical production plant is not already installed.

Heat processing methods are also known which generally operate in a fluidized bed and are based either on pyrohydrolysis of the spent linings to over 1000° C. as described by U.S. Pat. No. 4,065,551 (Elkem) or U.S. Pat. No. 4,113,832 and U.S. Pat. No. 4,116,809 (Kaiser), or on simple combustion in air or in an atmosphere which oxidizes the carbon parts at a temperature of approximately 800° C. that is sufficient to break down the cyanides without causing any extensive emission of volatile fluorine compounds as described by U.S. Pat. No. 4,053,375 (Reynolds) or the article by L. C. Blayden and S. G. Epstein, Journal of Metals, July 1984 page 24.

The scope of the processes and devices which use the heat method is restricted by the type and composition of the spent linings to be treated. On account of the fusion of certain eutectic compounds which form during combustion, the particles of spent linings have a strong tendency to agglomerate. It becomes impossible to prevent them from massing together and subsequently to maintain a fluidized bed, more especially a dense bed if combustion is conducted for example in a rotating furnace with long stay times. This caking phenomenon, which is already quite significant with loads of spent linings made up solely of carbon products, is greatly increased with loads containing refractory oxides, in particular silica whose weight content must not exceed 3 or 4% as reported in the article by E. R. Cutshall and L. O. Daley, Journal of Metals, November 1986, page 37 table II.

To overcome this problem of caking, and to achieve full insolubilization of the fluoride compounds, U.S. Pat. No. 5,164,174 (EP 0542404) (Reynolds) recommends the addition of 2 additives to the spent linings which are finely ground before heat treatment, calcium carbonate firstly to trap the fluorine of the fluoride compounds in $CaF_2$ form, and secondly a metal silicate, preferably calcium disilicate which acts as an anti-binding agent during heat treatment.

For full efficiency, this process must, at the end of the heat treatment conducted at a sufficiently high temperature to break down the cyanides, be completed by a final operation to insolubilize residual soluble fluorides, which consists of spraying lime solution onto the pulverulent mixture when it exits the heat treatment furnace. In addition to the fact that this additional operation conducted in a semi-humid medium makes the process more complicated and costly, the final product obtained is difficult to stock or handle in its finished state owing to the presence of dust and fine particles.

To solve the same problem, U.S. Pat. No. 5,245,115 (EP 0465388B) and U.S. Pat. No. 5,365,012 (EP 0465388B) (Aluminium Pechiney) recommends the addition of a single additive with a lime base, preferably gypsum, mixed with the finely ground spent linings in order to insolubilize the fluoride compounds to $CaF_2$ form at the end of heat treatment that is carried out at sufficient temperature to break down the cyanides but of sufficiently short duration to avoid sticking phenomena. For this purpose, the pulverulent mixture is injected under gas pressure into the top of a cyclone reactor and is collected at its base in the form of an inert pulverulent residue. These processes are limited however in capacity, as the flow rates of the pulverulent mixture to be treated allowable by the injector are relatively low. Also, with batches of spent linings which have a high sodium fluoride content, part of the sodium may recombine with the $SO_4^{2-}$ anion of the gypsum to form $Na_2SO_4$ instead of being insolubilized to sodium aluminosilicate form. Although it is non toxic, the sodium sulphate thus formed is lixiviable, and it may, beyond a certain lixiviation rate, not allow said inert pulverulent residue to be discharged as waste.

THE PROBLEM RAISED

Bearing in mind that a factory producing aluminium by electrolysis with a capacity of 240,000 tonnes (SI)/year generates approximately 4000 tonnes/year of spent linings, and that these spent linings contain high levels of fluoride derivatives (up to 200 kg of fluorine per tonne), sodium products (up to 200 kg of sodium per tonne) and non-negligible quantities of cyanides (up to 10 kg/tonne) it proves necessary, with regard to economic restraints or technical restrictions related to processes of the prior art, to develop a new industrial process able to:

a) treat spent linings under economically acceptable conditions, regardless of their aluminosilicate content, b) not only achieve full breakdown of the cyanides during treatment and insolubilization of the fluorine contained in the impregnating fluoride compounds, but also to cause insolubilization of all the metals in particular sodium;

c) produce a final inert residue in a form that is sufficiently consolidated so that it can either be collected as waste, stored or transported in the event of re-use without any risk of atmospheric pollution through the formation of dust.

PURPOSE OF THE INVENTION

The process of this invention meets this triple need. It is based on the finding that through the addition of appropriate additives to the ground, spent linings it is possible to achieve efficient insolubilization not only of the fluorine contained in the impregnating fluoride compounds but also of alkali metals such as sodium, and at the same time, unlike usual practice, to promote the agglomeration of the mixture components by compacting hem into appropriate form before heating, preferably pellet form, whose consolidation is continued during heating so that they can be easily handled, transported, stored or collected as waste without the formation of dust.

More precisely, this invention relates to a process for insolubilizing and consolidating in pellet form the spent linings from electrolysis cells used to produce aluminium, which comprises grinding said spent linings, made up of carbon products and aluminosilicate products impregnated with fluoride and cyanide compounds, and mixing them in an intimate manner with various pulverulent refractory additives before heat treatment or firing, characterized in that after the addition of:

- a first additive, intended to fix the alkali metals during heating, in particular the sodium derived from the fluoride compounds, which is chosen from the group of aluminosilicates,
- and subsequently a second additive intended firstly, with or without fusion during firing, to combine with the impregnating fluoride compounds to form new stable insoluble compounds such as $CaF_2$, and which secondly, through its remaining non-combined part, is able to ensure before, and especially during firing, the consolidation of the mixture, said second additive being chosen from the group of calcium oxides and salts, preferably limestone cements and mortars, the intimate mixture of ground, spent linings and said first and second pulverulent additives are agglomerated into pellet form before firing at a temperature in the range of from 700° C. to 950° C. that is sufficient to break down the cyanides but insufficient to cause the fluoride compounds to start decomposing.

BRIEF DESCRIPTION OF THE DRAWING

FIG. 1 illustrates the successive stages of the process of the invention.

DESCRIPTION OF THE INVENTION

During numerous tests, the applicant found in respect of the massing together of the mixture particles which is produced at the start of firing and which may, if no anti-binding agent is used, lead to total caking of the entire mixture load and cause blocking of reactions, that it is possible to prevent this caking if, prior to firing, the particles of the mixture are given form by agglomeration with expediently chosen additives which contribute towards consolidation of the agglomerates formed over the subsequent stages of the process without however impairing the efficiency of insolubilization reactions and therefore without impairing the ability of said additives to combine in stable manner with the fluorine of the fluoride compounds impregnating the spent linings and with the alkali metals, in particular the sodium released by fluorine displacement.

This consolidation has numerous advantages offering the possibility for example of disposing of the final inert residue as waste or storing said residue in thick, dense beds with no risk of crushing said pellets which have become sufficiently resistant. In the event of re-use, said consolidation allows the transport and handling of said pellets with no risk of pellet disintegration leading to formation of dust and atmospheric pollution.

The choice of the most appropriate additives (see Table 2) and the best operating conditions were determined in relation to their efficiency after numerous mixing tests with spent linings of all kinds whose weight composition varied fairly considerably even in respect of basic constituents, namely:

carbon matter 30 to 50% alumina or aluminosilicate refractories 30 to 40% (silica reaching as high as one half of the aluminosilicate refractory weight).

These basic constituents being impregnated with cyanides ($CN \leq 1\%$ of total weight), and with fluoride compounds, chiefly in sodium fluoride form, representing as much as 35% or even 40% of the total weight.

Previously crushed spent linings are ground to obtain particles less than 5 mm in size, preferably less than 2.5 mm, but subsequent insolubilization does not achieve better results if grinding is continued to even finer particle size whereas industrial costs rise sharply beyond this point.

The first additive intended chiefly to fix the alkali metals during firing, in particular sodium, is chosen from the group of aluminosilicates and is a feldspar or a clay such as kaolin for example or bentonite of which some typical compositions are given in Table 1 below:

TABLE 1

| Main constituents | Kaolin SIAL 100(x) | Kaolin SP 20 LAUDÉ(x) | Feldspar FHB 200(x) | Kaolin SP 20 BERRIEN(x) |
|---|---|---|---|---|
| $SiO_2$ % | 57 | 50.6 | 67.5 | 47.3 |
| $Al_2O_3$ % | 28 | 34.1 | 18.5 | 36.5 |
| $K_2O$ % | 4.6 | 2.55 | 0.80 | 1.40 |
| $Fe_2O_3$ % | 0.9 | 0.95 | 0.40 | 0.40 |
| $Na_2O$ % | <0.10 | 0.03 | 9.5 | |
| CaO % | 0.11 | 0.04 | 0.90 | |
| $TiO_2$ % | 0.36 | 0.10 | 0.30 | 0.35 |
| MgO % | 0.30 | 0.40 | 0.30 | |
| $P_2O_5$ % | | 0.16 | | |
| % Loss on firing at 950° C. | 7.3 | 10.8 | 0.8 | 12.3 |

(x) Trade names

It should be recalled in this respect that hot fixation of sodium by a clay to form an insoluble synthesis compound may be conducted for example with kaolinite ($2SiO_2, Al_2O_3, 2 H_2O$) with formation of insoluble feldspars such as hydroxysodalite following the reaction:

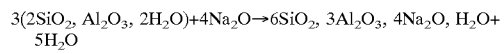
$3(2SiO_2, Al_2O_3, 2H_2O)+4Na_2O \rightarrow 6SiO_2, 3Al_2O_3, 4Na_2O, H_2O+ 5H_2O$ The second additive, intended, with or without fusion during firing, to combine with the impregnating fluoride compounds, especially $NaF$, $AlF_3$ and $Na_3AlF_6$, while providing consolidation of the mixture agglomerated during the process, may be lime CaO, calcium carbonate $CaCO_3$, but is preferably chosen from the group of limestone cements and mortars. In this respect, the applicant advantageously experimented with quick setting cements of Portland type which, while achieving good insolubilization of fluorine by combining to form $CaF_2$, provide excellent consolidation of the agglomerated particles during firing (see table 2).

The choice of additives is not only related to their efficiency, i.e. their insolubilizing and consolidating performance, but also takes into account economical criteria, unit cost, market availability, required quantities in relation to the weight of treated spent linings.

It was therefore determined (table 4) which weight compositions of mixtures could best be treated on an industrial scale taking into consideration fluctuations in the content of silica and impregnating products in spent linings. Per one tonne of mixture, load composition varies over the following ranges:

- 400 to 600 kg of ground spent linings<2.5 mm, i.e. 40 to 60% by weight
- 150 to 350 kg of a 1$^{st}$ additive of kaolinite clay type in powder form, i.e. 15% to 35% by weight
- 150 to 350 kg of a 2nd additive of cement type in powder form, i.e. 15% to 35% by weight.

With weight proportions of spent linings that are over 60%, therefore limiting the proportion of additives to 40% at the most, it is found that lower insolubilization of fluorine and sodium is achieved (see table 4) regardless of the particle size to which the spent linings are ground.

With weight proportions of spent linings that are Less than 40% by weight, and subsequent weight proportions of additives that are higher than 60%, excellent insolubilization and consolidation results are obtained but the process loses its economic advantage since the cost ratio between processing and the weight of treated spent linings becomes prohibitive.

A further essential characteristic of the process is the compacting into shape of the mixture of ground spent linings/additives before firing. This compacting of the pulverulent mixture may be obtained by any known means of giving form to powder materials such as compression or dry or slightly wet extrusion. Beads or granules are obtained which can be magnified and rounded into pellets by granulation, but in much simpler manner using direct granulation of the pre-moistened mixture at a humidity setting of preferably 15% to 25% by weight of dry mixture, it is possible to obtain pellets with excellent cohesion properties as shall be described below in the detailed operations of the process.

The firing or heat treatment of the pellets whose diameter may be adjusted to between 6 and 20 mm depending in particular on the conditions of heat treatment, must be conducted at a temperature of at least 700° C. to break down the cyanides, but must not exceed 950° C. in order not to run the risk of initiating decomposition of the fluorides which have already been stabilized. The temperature setting is preferably in the range of from 800° C. to 900° C. (see table 3). Firing time may vary between 1 h to 6 h according to the type of additives and the weight composition of the mixture, but more especially in relation to the method of firing chosen and the average size of the pellets. For identical pellets, the optimal firing time which is generally 4 hours in a static bed is only 3 hours for transit furnaces using crucibles and 1 to 2 hours for rotating furnaces or furnaces with fluidized beds, the two latter being especially suited to the process of the invention on account of the excellent cohesion of the pellets during firing despite knocking and wear between pellets (see table 2). It is to be noted that if the carbon content of the spent linings is very high and yields a carbon content after mixing of at least 25% in green (unfired) pellets, the latter may be used as additional fuel in incinerating furnaces.

After firing, the inert residue in pellet form can be either be discharged as waste, stored or re-used for a new application, for example as filling material.

Control tests carried out on the pellets before, during or after firing give the following results:

Lixiviation test on fired pellets crushed to 4 mm in accordance with standard NF-X31210; the parts that can be lixiviated as fluorine and sodium are titrated and F and Na weights are related to the weight of the residue in pellet form. The fluoride ion concentration F$^-$ in the lixiviation liquid is also assessed.

Gas Fluoride Release During Firing

Gas samples are taken from a gas flow controlled by a sensor device at the furnace stack exit and the fluorine is titrated and expressed as a weight percentage in relation to the fluorine contained in the green pelleted mixture.

Mechanical Resistance 3 types of test are carried out on green and fired pellets:
a) Cohesion test using TURBULAO® apparatus on 40 g of pellets placed in a 250 ml cylindrical jar and subjected for 5 min to turbulence in 3 successive rotation axes:

If, after the test, the percentage of collected fines is less than 1% for fired pellets and 5% for green (unfired) pellets, results are considered good. Cohesion is considered poor or insufficient if the percentage of fines is more than 4% for fired pellets and more than 15% for green pellets. Over intermediate ranges, cohesion is considered average or low.

b) Resilience test consisting of dropping the pellets from a height of 2 metres onto a steel support. The test comprises 5 successive drops of 5 pellets and the result is expressed as a percentage of pellets which remain intact; it is therefore 100% if no pellet breaks. This test especially checks pellet resilience during skip loading.

c) Crush resistance test consisting of dropping an 11 g steel ball from a height of 65 cm onto a pellet to check pellet resistance during loading and unloading. As previously, the result is expressed as a percentage of pellets which remain intact.

On the basis of the above specifications, the most significant results of the different tests are grouped under tables 2 to 4 below.

Table 2 groups together test results for insolubilization and consolidation conducted with various Kaolin and feldspar additives and with cements mixed in respective weight proportions of 25% and 25% with 50% spent linings of all kinds ground to between 0 and 2.5 mm and fired under standard conditions of 1.5 hours at 900° C.

TABLE 2

| TEST N° | FORMULATION WEIGHT % | Na LIX | F LIX | GASEOUS F % IN RELATION TO TOTAL FLUORINE OF FORMULATION | MECHANICAL RESISTANCE BEFORE FIRING % ACCEPTANCE | | | MECHANICAL RESISTANCE AFTER FIRING % ACCEPTANCE | | |
|---|---|---|---|---|---|---|---|---|---|---|
| | | | | | Turbula | Drop from 2 m | Ball impact | Turbula | Drop from 2 m | Ball impact |
| 1 | 50% spent linings Kaolin (sp 20 laude) 25% Cl Marine Set 25% | 0.44 | 0.26 | <0.5% | Good | 60 | 0 | Good | 72 | 0 |

TABLE 2-continued

| TEST N° | FORMULATION WEIGHT % | Na LIX | F LIX | GASEOUS F % IN RELATION TO TOTAL FLUORINE OF FORMULATION | MECHANICAL RESISTANCE BEFORE FIRING % ACCEPTANCE | | | MECHANICAL RESISTANCE AFTER FIRING % ACCEPTANCE | | |
|---|---|---|---|---|---|---|---|---|---|---|
| | | | | | Turbula | Drop from 2 m | Ball impact | Turbula | Drop from 2 m | Ball impact |
| 2 | Spent linings 50% Kaolin (Sial 100) 25% Cl Portland quick set 25% | 0.45 | 0.27 | <0.5% | Good | 80 | 0 | Good | 100 | 4 |
| 3 | Spent linings 50% Kaolin (Sial 100) 25% Cl SR 50.00 25% (Lafarge aluminate cement) | 0.26 | 0.1 | <0.5% | Good | 80 | 0 | Good | 32 | 0 |
| 4 | Spent linings 50% Kaolin 50% Cl Portland 25% | 0.3 | 0.11 | <0.5% | Very poor | 0 | 0 | Good | 88 | 8 |
| 5 | Spent linings 50% Feldspar FHB 200 25% Cl Portland 25% | 0.3 | 0.2 | <0.5% | Good | 80 | 16 | Good | 100 | 20 |
| 6 | Spent linings 50% Feldspar FHB 200 25% Cl Marine set + slag cement 25% | 0.12 | 0.05 | <0.5% | Good | 96 | 28 | Good | 100 | 80 |
| 7 | Spent linings 50% Feldspar FHB 200 25% Cl Portland quick set 25% | 0.17 | 0.1 | <0.5% | Good | 100 | 80 | Good | 100 | 84 |

It is found that with no cement, and despite excellent insolubilization leading to very low lixiviation rates for Na and F and perfectly satisfactory mechanical resistance after firing (at least in 2 of the 3 tests conducted), those pellets prepared solely from the binary mixture spent linings/kaolin (test N° 4) have very poor cohesion properties when green which considerably restricts the advantage of this process for this formulation.

Conversely, if perfectly acceptable cohesion properties were recorded for green pellets of the ternary mixtures of spent linings/kaolin/cement (tests 1, 2 and 3), insolubilization results are only considered pretty poor at least for the first 2 formulations whose lixiviation levels remain in the region of 0.45% for Na and in the region of 0.25% for F.

Finally, it is the ternary mixtures of spent linings/feldspar/cement which prove to be the most efficient from all viewpoints since the pellets prepared from these mixtures (tests 5, 6 and 7) shows excellent mechanical resistance both before and after firing (regardless of the type of test) and very good insolubilization results in particular in respect of tests 6 and 7.

The influence of firing conditions on the extent or insolubilization of the various mixtures is examined in table 3 below, which groups together the characteristics of lixiviation obtained with pellets prepared from the above-mentioned binary mixture (spent linings/kaolin) and the 3 ternary mixtures (spent linings/kaolin/cement) (spent linings/feldspar/cement) (spent linings/-kaolin/clay) and fired under different time and temperature conditions.

TABLE 3

| TEST N° | FORMULATION WEIGHT % | HEATING TIME (IN HOURS) | TEMPERATURE (° C.) | LIXIVIABLE Na % | LIXIVIABLE F % | GASEOUS F IN RELATION TO TOTAL FLUORINE OF FORMULATION | LIXIVIABLE CN PPM |
|---|---|---|---|---|---|---|---|
| 8 (2) | 50% spent linings Kaolin (Sial 100) 25% Cl Portland 25% | 1,5 | 900 | 0.45 | 0.27 | <0.5 | <5 |
| 9 | Spent linings 50% Kaolin (Sial 100) 25% Cl Portland 25% | 1 | 835 | 0.7 | 0.4 | <0.5 | <5 |
| 10 | Spent linings 50% Kaolin (Sial 100) 25% Cl Portland 25% | 3 | 835 | 0.23 | 0.14 | <0.5 | <5 |
| 11 | Spent linings 50% Feldspar FHB 200 25% Cl Portland quick set 25% | 1 | 835 | 0.75 | 0.52 | <0.5 | <5 |
| 12 | Spent linings 50% Feldspar FHB 200 25% Cl Portland quick set 25% | 1 | 900 | 0.3 | 0.2 | <0.5 | <5 |

TABLE 3-continued

| TEST N° | FORMULATION WEIGHT % | HEATING TIME (IN HOURS) | TEMPERATURE (° C.) | LIXIVIABLE Na % | LIXIVIABLE F % | GASEOUS F IN RELATION TO TOTAL FLUORINE OF FORMULATION | LIXIVIABLE CN PPM |
|---|---|---|---|---|---|---|---|
| 13 (7) | Spent linings 50% Feldspar FHB 200 25% Cl Portland quick set 25% | 1,5 | 900 | 0.17 | 0.1 | <0.5 | <5 |
| 14 | Spent linings 50% Kaolin (Sial 100) 25% Clay 25% | 1 | 835 | 0.54 | 0.4 | <0.5 | <5 |
| 15 | Spent linings 50% Kaolin (Sial 100) 25% Clay 25% | 3 | 835 | 0.27 | 0.22 | <0.5 | <5 |
| 16 | Spent linings 50% Kaolin (Sial 100) 25% Clay 25% | 6 | 835 | 0.03 | 0.02 | <0.5 | <5 |
| 17 | Spent linings 50% Kaolin (Sial 100) 50% | 1 | 700 | 1.2 | 0.82 | <0.5 | <5 |
| 18 (4) | Spent linings 50% Kaolin (Sial 100) 50% | 1,5 | 900 | 0.11 | 0.09 | <1 | <5 |

( ) Corresponding test n° in table 2

It is found (test n° 17) that the almost full elimination of cyanides is achieved after one hour of firing the binary mixture of spent linings/kaolin at 700° C., but that the insolubilization of the fluoride compounds is totally insufficient. Although, after 1½ h of firing at 900° C., lixiviation results are excellent (test n° 18) it is found on the other hand that there is an increase in fluorine loss in gaseous form related to the lack of a $2^{nd}$ additive (cement, clay, CaO or $CaCO_3$) which is able to consolidate the residue pellets and to trap the fluorine released by initial decomposition of some fluoride compounds.

The tests with the ternary mixtures of spent linings/kaolin/cement (N° 8, 9 and 10) and spent linings/kaolin/clay (N° 14, 15 and 16) show that after 3 hours' firing at 835° C. the lixiviation rates obtained for Na and F are fully comparable with those obtained after 1.5 hours of firing at 900° C. These lixiviation rates, which represent the extent of insolubilization of the residues in pellet form after firing, are further greatly improved if firing time is extended to 6 hours but in this case the cost of the treatment is considerably increased and may become prohibitive in terms of industrial use.

Table 4 below summarizes the results of the lixiviation and mechanical resistance tests on ternary mixtures of spent linings/feldspar FHB 200 and quick set Portland cement in which the content of spent linings has been varied (tests n° 19 to 21).

TABLE 4

| | FORMULATION | | Na | F | MECHANICAL RESISTANCE AFTER FIRING % ACCEPTANCE | |
|---|---|---|---|---|---|---|
| Test N° | WEIGHT % | HEATING CHARACTERISTICS | LIX % | LIX % | Drop from 2 m | Ball impact |
| 19 (7) (13) | Spent linings 50% FHB 200 25% Cl Portland quick set 25% | 1,5 hours at 900° C. | 0.17 | 0.1 | 100 | 84 |
| 20 | Spent linings 55% FHB 200 25% Cl Portland quick set 20% | 1,5 hours at 900° C. | 0.32 | 0.12 | 100 | 44 |
| 21 | Spent linings 60% FHB 200 20% Cl Portland quick set 20% | 1,5 hours at 900° C. | 1.1 | 0.7 | 100 | 12 |

( ) corresponding test n° in tables 2 and 3

If the spent lining content is 60% or over, lixiviation results and therefore insolubilization deteriorate significantly and to a lesser extent mechanical resistance after firing and therefore consolidation.

As indicated above, when the spent lining content is less than 40% the process of the invention achieves even better performance but its operation costs become prohibitive.

IMPLEMENTATION OF THE INVENTION

The process of the invention will be better understood through the detailed description of its implementation with reference to FIG. 1 which illustrates the successive stages of the process.

One tonne of spent linings 1, derived from dry de-lining or the electrolysis cells used for the production of aluminium and forming a mixture of all types of aluminosilicate refractory materials and carbon blocks with a granule size of 0–700 mm, is crushed and then ground, A, to obtain a powdered product 2 of granule size 0–2.5 mm whose weight contents of carbon, fluorine, sodium, silicone and cyanide are respectively 38.4%, 9.2%, 14.6%, 11.1% and 0.12%.

Powdered product 2 is mixed B firstly with 500 kg of a first pulverulent additive 3 made up of feldspar FHB200 (sodium feldspar of albite type whose typical analysis is given in table 1) and secondly with 500 kg of a second pulverulent additive 4 made up of quick setting Portland cement for example Lafarge CEM 52, 5R cement.

The resulting pulverulent mixture 5 is moistened by spraying water 6 to the proportion of 15% to 25% of dry mixture weight before being pelleted C in a granulator made up of an inclined rotating circular platform on which small nodules are formed. These nodules increase in size through coating in contact with the moistened pulverulent mixture 5 which is permanently recycled to form increasingly larger pellets which are ejected from the granulator when they reach the desired size, generally a diameter in the range of from 6 mm to 20 mm, in this example 10 mm.

The green pellets, 7, of diameter size 10 mm whose specific volume before firing is in the range of from 1 to 1.2 $g/cm^3$ are then heated for 1.5 hours at 900° C., D, in a fluidized bed reactor with a suitable air flow setting for fluidization. Control of the fluorine content of gases released from the reactor under constant flow is carried out by collecting a gas sample every 15 minutes.

The fired pellets 8 representing 1600 kg of residue are subjected to different tests to check insolubilization (standard NF-X31210) and mechanical resistance. The following results were obtained:

Lixiviable fluorine %=0.1
Lixiviable Na %=0.17
Mechanical resistance:
 a) cohesion test (Turbula): good (<1% fines)
 b) resilience test: 100%
 c) crush resistance test: 84%

It is to be noted that with this same batch of fired pellets 8, lixiviation tests were conducted in accordance with 2 other standards (E.P.A.—United States, and M.E.N.V.I.Q.—Canada).

The results recorded also lay within authorized limits, being respectively:

| E.P.A. | Lixiviable fluorine % = | 0.07 |
|---|---|---|
|  | Lixiviable Na % = | 0.65 |
| M.E.N.V.I.Q. | Lixiviable fluorine % = | 0.006 |
|  | Lixiviable Na % = | 0.55 |

The low lixiviation rates recorded, well below the current standards in force (lixiviable F<0.5%) and the excellent mechanical resistance of the pellets meant that batch 8 of 1600 kg of inert residue in pellet form could be discharged in a public waste tip 8a, and part of this discharge 8b could be used as extra ballast for filler material.

Priority French Patent Application No. 96-14723 is incorporated by reference.

We claim:

1. Process for insolubilizing and consolidating in pellet form the spent linings from electrolysis cells for the production of aluminum, comprising grinding spent linings made up of carbon products and aluminosilicate products impregnated with fluoride and cyanide alkaline compounds, mixing the resultant ground linings in an intimate manner with pulverulent refractory additives before heat treatment or firing, wherein said additives comprise:

a first additive selected from the group consisting of aluminosilicates, and a second additive selected from the group consisting of calcium oxides and salts, agglomerating the intimate mixture of ground, spent linings and said first and second pulverulent additives into pellet form and firing at a temperature in the range of from 700° C. to 950° C.

2. Process in accordance with claim 1, wherein the spent linings are ground to a particle size of less than 5 mm.

3. Process in accordance with claim 1, wherein said first additive is a clay or feldspar.

4. Process in accordance with claim 1, wherein said second additive is CaO or $CaCO_3$.

5. Process in accordance with claim 1, wherein said second additive is Portland cement.

6. Process in accordance with claim 1, wherein the weight proportion of ground spent linings in said intimate mixture is in the range of from 40% to 60%.

7. Process in accordance with claim 1, wherein the weight proportion of the first additive lies between 15% and 35%.

8. Process in accordance with claim 1, wherein the weight proportion of the second additive lies between 15% and 35%.

9. Process in accordance with claim 1, wherein the agglomeration into pellet form is conducted by compression or extrusion of a pre-moistened mixture followed by granulation.

10. Process in accordance with claim 1, wherein the agglomeration into pellet form is made by direct granulation of a pre-moistened mixture at a humidity setting in the range of from 15% to 25% of dry mixture weight and to a pellet diameter size in the range of from 6 mm to 20 mm.

11. Process in accordance with claim 1, wherein the firing temperature of the pellets is within the range of from 800° C. to 900° C.

12. Process in accordance with claim 1, wherein the time of pellet firing is between 1 hour and 6 hours.

13. Process in accordance with claim 12, wherein the time of pellet firing is in the range of from 1 hour to 2 hours.

14. Process in accordance with claim 13, wherein pellet firing is carried out in a rotating furnace or a fluidized bed furnace.

15. Process in accordance with claim 1, wherein the firing of pellets whose carbon content is at least 25% is conducted in an incinerating furnace in which they serve as additional fuel.

16. A process for the production of filler material comprising adding the pellets made according to claim 1 to a separate filler material.

* * * * *